United States Patent Office 2,760,372
Patented Aug. 28, 1956

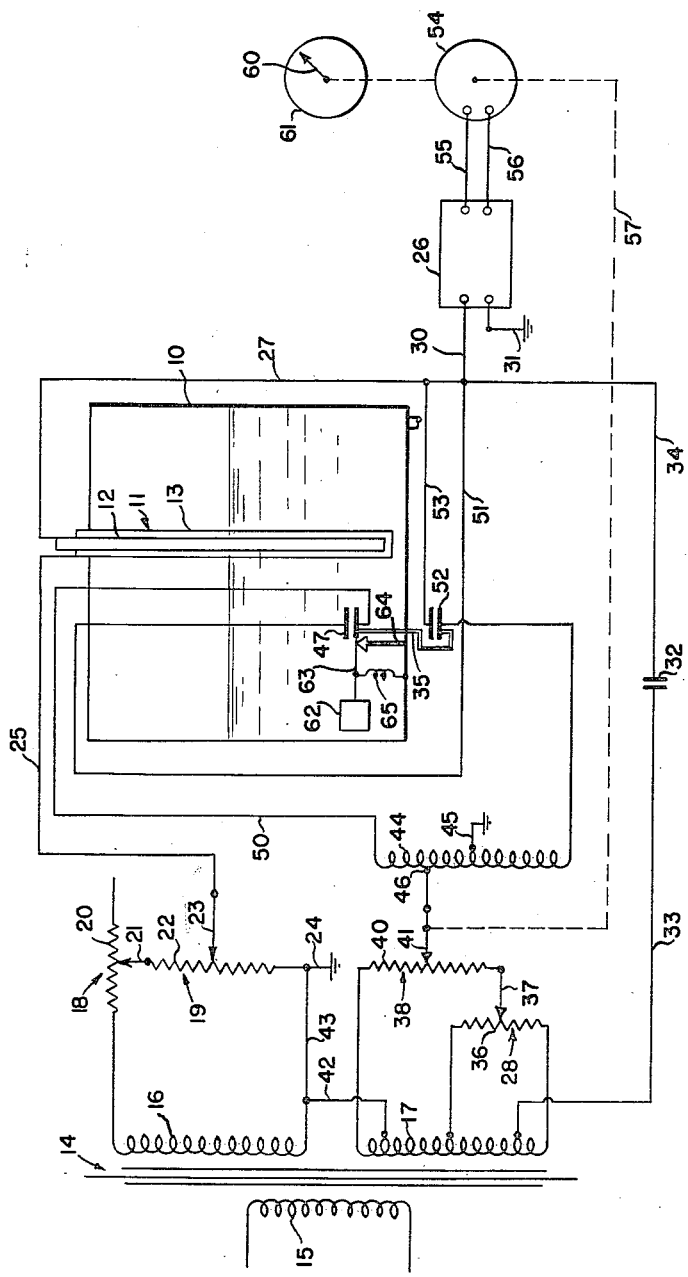

2,760,372

FLUID QUANTITY MEASURING APPARATUS

John F. Storm, Minneapolis, Minn., assignor to Minneapolis-Honeywell Regulator Company, Minneapolis, Minn., a corporation of Delaware Application August 3, 1953, Serial No. 372,033

14 Claims. (Cl. 73—304)

This invention relates generally to fuel quantity measuring apparatus and particularly to apparatus for measuring the weight of fuel. Briefly, the invention comprises utilizing a capacitive type sensing element sensitive to the dielectric constant and height or volume of the fuel in the container and a further capacitive type sensing element sensitive to the dielectric constant of the fuel, the further sensing element being acted upon according to the density of the fuel to vary the distance between the plates of the element with change in fuel density. As a result, the density of the fuel affects the ultimate signal to provide an indication of the height times density or weight of the fuel in the container. It is therefore an object of this invention to design simple, light-weight, accurate apparatus for measuring the weight of fuel in a container.

Another object of the invention is to design fuel quantity measuring apparatus using capacitive type sensing elements for measuring the weight of fuel in a container.

Another object of the invention is to design fuel quantity measuring apparatus using capacitive type sensing elements in which the effect of variations in the dielectric constant of the fuel is nullified and the fuel density affects the quantity indication.

Another object of the invention is to design fuel quantity measuring apparatus using a sensing element sensitive to the height and dielectric constant of the fuel and a further sensing element sensitive to the dielectric constant and density of the fuel for obtaining an indication due to the height and density of the fuel.

For a further, more detailed description of the invention, reference is had to the following discussion and the accompanying drawing in which:

The single figure is a schematic diagram showing one embodiment of the invention.

In the drawing, a fuel tank 10 has within it a measuring tank unit 11 having an inner electrode 12 and an outer electrode 13. The device 11 is a capacitive type tank unit in which the two electrodes, 12 and 13, are the capacitor plates. The capacitance of the tank unit 11 changes with rise and fall of fuel in the tank 10. This is because the dielectric constant of air is unity while the dielectric constant of the fuel in the tank is approximately two. This results in the tank unit 11 having a capacitance value, when the tank 10 is full, of approximately twice its capacitance value when the tank 10 is empty.

The circuit shown is energized by a transformer 14 having a primary winding 15 connected to the source of power, not shown, and a pair of secondary windings, 16 and 17. The upper terminal of transformer secondary winding 16 is connected to one terminal of resistor 20 of a rheostat 18 also having a wiper arm 21. The wiper arm 21 is connected to one terminal of resistor 22 of a potentiometer 19 also having a wiper arm 23. The other terminal of the potentiometer resistor 22 is connected to the lower end of transformer secondary winding 16 and also to a ground terminal 24.

The wiper arm 23 of potentiometer 19 is connected to the outer electrode 13 of tank unit 11 by a conductor 25. The inner electrode 12 of tank unit 11 is connected to one of the input terminals of an amplifier 26 by conductors 27 and 30. The other input terminal of amplifier 26 is connected to a ground terminal 31.

A capacitor 32 has one of its plates connected near the lower end of transformer secondary winding 17 by a conductor 33 and the other plate of the capacitor is connected to the ungrounded input terminal of amplifier 26 by conductors 34 and 30.

A potentiometer 28 having a resistor 36 and a wiper arm 37 has its resistor 36 connected across the lower portion of transformer secondary winding 17. A potentiometer 38 having a resistor 40 and a wiper arm 41 has its resistor 40 connected between the upper terminal of transformer secondary winding 17 and wiper arm 37 of potentiometer 28. Transformer secondary winding 17 is connected near its upper terminal to ground terminal 24 by conductors 42 and 43.

An autotransformer 44 is connected to a ground terminal 45 at a point between its end terminals. Wiper arm 41 of potentiometer 38 is connected to a point 46 of autotransformer 44 between one end terminal and its ground connection.

A capacitive type compensator tank unit 47 is shown within and near the bottom of the container 10. The purpose of the compensator tank unit is to nullify the effect of variations in the dielectric constant of the fuel on the signal from tank unit 11 to amplifier 26. One plate of the compensator tank unit 47 is connected to the upper terminal of autotransformer 44 by a conductor 50. The other plate of the compensator tank unit 47 is connected to the ungrounded input terminal of amplifier 26 by conductors 51 and 30.

A capacitor 52 has one electrode thereof connected to the lower terminal of autotransformer 44 while the other electrode of the capacitor 52 is connected to the ungrounded input terminal of amplifier 26 by conductors 53 and 30.

The purpose of capacitor 32 is to neutralize the minimum signal from tank unit 11, which would be due to no fuel in the tank. Thus, the resultant signal due to the signals from tank unit 11 and capacitor 32 would be an indication only of the height and the dielectric constant of the fuel in the tank 10.

The signal on the input terminals of amplifier 26 due to capacitor 52 balances out the effect of the signal from compensator tank unit 47 on the input terminals of amplifier 26 which would exist if there were no fuel between the plates of compensator tank unit 47. Thus, the resultant signal on the input terminals of amplifier 26 due to compensator tank unit 47 and capacitor 52, as the circuit has been so far described, would be the effect of the signal from compensator tank unit 47 due to the dielectric constant of the fuel in tank 10.

The signals from tank units 11 and 47 oppose each other on the input circuit of amplifier 26.

Amplifier 26 is connected to a motor 54 by conductors 55 and 56. Motor 54 is connected by mechanical connection 57 to the wiper arm 41 of potentiometer 38 for rebalancing purposes. Operation of motor 54 thus varies the energizing voltage on autotransformer 44 to vary the voltage across the compensator tank unit 47 and vary the amount of the signal from compensator tank unit 47 until the signal from tank unit 47 due to the dielectric constant of the fuel between its plates balances out the signal from tank unit 11 due to the height of fuel in the tank and the dielectric constant of the fuel in the tank. When these two signals neutralize each other there is no input signal to amplifier 26 and thus no rotation of motor 54. As a result, the voltage on wiper arm 41 of potentiometer 38 is an indication of the height of the fuel in tank 10.

Motor 54 is also connected in operative relation to indicator needle 60 of an indicator dial 61 for providing an indication of the quantity of fuel in the tank 10.

The circuit is calibrated as follows. With the tank 10 empty wiper arms 21 is moved along rheostat resistor 20 until indicator needle 60 is almost at zero. Wiper arm 23 is then moved along potentiometer resistor 22 until the indicator shows zero, at which point wiper arm 41 is at zero potential. For full calibration the tank 10 is filled and wiper arm 37 is moved along potentiometer resistor 36 until the indicator reads full, wiper arm 41 having been driven by motor 54 to the lower end of potentiometer resistor 40.

If tank 10 is rectangular in shape, as shown in the drawing, and uncharacterized tank unit provides a signal which is indicative not only of the height of the fuel in the tank but also of the volume of the fuel in the container. If the tank is not uniform in its cross-sectional area from top to bottom the tank unit can still be made to provide an indication of the volume of fuel in the tank by characterizing the tank unit as is shown in either the Condon Reissue Patent 23,844, or the Meyers application, Serial Number 192,685, filed October 28, 1950, both assigned to the same assignee as the present invention.

As thus far shown and described the apparatus provides 100 per cent compensation for variation in dielectric constant of the fuel in the tank and provides an indication only of either the height or the volume of the fuel in the tank. That is, the indication is independent of the dielectric constant of the fuel except in so far as the fuel dielectric constant must be different from that of air, or whatever medium exists above the fuel. However, because engines use fuel in accordance with weight, or B. t. u.'s, in order to develop horse power it is important that the indication which is seen by the operator of the engine be in pounds of fuel rather than purely in height or volume of fuel. If the volume of fuel is multiplied by the density of the fuel a weight indication results. The subsequent discussion shows how the density indication is inserted into the circuit in order to make a true weight measurement apparatus from the circuit so far described.

A float 62 is connected to the lower plate of compensator capacitor 47 by arm 63. A pivot 64 balances the float against the plate of the compensator capacitor.

A spring 65 operates against the float 62 by being connected to arm 63 and pulling downwardly on the arm and so provides an Archimedes type of float, that is, the float always remains submerged.

The float 62 has such density that it is always at least slightly lighter, or less dense, than the fuel in the tank 10. When the density of the fuel in the tank increases the float 62 will tend to rise, as its buoyancy increases, against the action of spring 65, moving the lower capacitor plate of the compensator capacitor farther from the upper plate of the compensator capacitor. This varies the capacitance of the compensator capacitor, and thus varies the signal from the compensator capacitor. When the density of the fuel decreases the float 62 will sink, moving the lower capacitor plate closer to the upper plate of capacitor 47. As a result, the signal from compensator capacitor 47 is thus not only due to the dielectric constant of the fuel in the tank but is also due to its density. This is because the capacitance of a capacitor is determined by the dielectric constant of the dielectric between the plates multiplied by the area of the plates and divided by the distance between the plates. Because the density affects the distance between the plates of the compensator capacitor its capacitance is a function of the density.

The lower plate of capacitor 52 is fixedly connected to the lower plate of compensator capacitor 47 by a mechanical connection 35 so that movement of the movable plate of capacitor 47 also results in movement of the movable plate of capacitor 52. It is important that the capacitance of capacitor 52 vary with change in capacitance of capacitor 47 due to change in density because change in density varies the effective empty capacitance, and thus the empty capacitance signal, of capacitor 47, which signal is counteracted by the signal from capacitor 52.

Since variations of dielectric constant affect the two tank units equally the effect of variation of dielectric constant is nullified and the magnitude of the resultant signal is due to the volume of fuel in the tank multiplied by its density. This can be easily shown as follows. Assume the apparatus is in balance. Then the current from tank unit 11 due to the fuel only is equal to the current from compensator capacitor 47 due to fuel only, or $$I_1 = I_2$$

the components in the circuit including tank unit 11 having the subscript 1, the components in the circuit including compensator capacitor 47 having the subscript 2. Then $$\frac{E_1}{X_{c_1}} = \frac{E_2}{X_{c_2}}$$

or $$E_1 2\pi f C_1 = E_2 2\pi f C_2$$
$$E_1 C_1 = E_2 C_2$$

with $E_1$ being the voltage on potentiometer wiper arm 23 and $E_2$ being the voltage at the upper terminal of autotransformer 44. $C_1$ and $C_2$ are the capacitances of tank unit 11 and compensator capacitor 47, respectively, due to the fuel only. However $$C = \frac{(k-1)A}{d}$$

where $k-1$ is the difference between the dielectric constant of the dielectric between the plates and the dielectric constant of air, $A$ is the area of the plates and $d$ the distance between the plates of a capacitor. Then $$\frac{E_1(k-1)A_1}{d_1} = \frac{E_2(k-1)A_2}{d_2}$$

or $$\frac{E_1 A_1}{d_1} = \frac{E_2 A_2}{d_2}$$

Thus it is seen that the effects of the dielectric constant of the fuel on the tank unit and compensator capacitor when the circuit is balanced cancel each other out. It should be noted however that while the actual value of fuel dielectric constant does not affect the operation, the apparatus still depends for proper operation upon a difference in dielectric constant between the fuel and the air, or other medium, above the fuel. This last equation can be rewritten as $$\frac{E_1 A_1 d_2}{d_1 A_2} = E_2$$

However $$\frac{E_1}{d_2 A_2}$$

is a constant and may be designated as B.

This leaves $$E_2 = B A_2 d_2$$

Since $E_2$ is dependent upon the voltage on potentiometer wiper arm 41 which is the rebalance voltage, it is a function of the quantity of fuel in the tank 10. It is seen that the quantity of fuel indication is dependent only upon $A_1$, which is the area of the portion of the plates of the measuring tank unit 11 immersed in the fuel, and upon $d_2$, which is the distance between the plates of the compensator capacitor 47, which distance varies with and is dependent upon the density of the fuel. This, then, provides the weight indication of the fuel in the tank 10.

As is seen, there has been devised a simple lightweight apparatus for providing a density indication of fuel in the tank which operates upon available components of presently used fuel gage apparatus for providing a true weight indication of the fuel in the container.

While a single embodiment of the invention has been shown and described it is understood that modifications can be made by those skilled in the art and it is therefore intended that the scope of this invention be limited only to the extent of the accompanying claims.

I claim as my invention:

1. Apparatus for measuring the quantity of fluid in a container comprising in combination: a first capacitive sensing element inserted in a container of fluid and extending from the top to the bottom of the container, said sensing element being sensitive to the height and dielectric constant of the fluid and connected to a source of alternating voltage of a first phase such as to derive a signal dependent in magnitude upon the height and dielectric constant of the fluid in the container; a second capacitive sensing element inserted in the container near the bottom of the container and sensitive to the dielectric constant of the fluid and connected to a source of alternating voltage of a second phase such as to derive a signal of opposite phase to the signal derived from said first sensing element, said signal derived from said second sensing element being dependent in magnitude upon the dielectric constant of the fluid in the container; means sensitive to the density of the fluid connected to said second sensing element and controlling the distance between the plates of said second capacitive sensing element such that the signal derived from said second sensing element is also dependent in magnitude upon the density of the fluid in the container; and comparing means connected to said first and said second capacitive sensing elements and nullifying the effect of variations in the dielectric constant and producing a signal indicative of the height and density of the fluid in the container.

2. Apparatus for measuring the quantity of fluid in a container comprising in combination: a first capacitive sensing element inserted in a container of fluid and extending from the top to the bottom of the container, said sensing element being sensitive to the volume and dielectric constant of the fluid and connected to a source of alternating voltage of a first phase such as to derive a signal dependent in magnitude upon the volume and dielectric constant of the fluid in the container; a second capacitive sensing element inserted in the container near the bottom of the container and sensitive to the dielectric constant of the fluid and connected to a source of alternating voltage of a second phase such as to derive a signal of opposite phase to the signal derived from said first sensing element, said signal derived from said second sensing element being dependent in magnitude upon the dielectric constant of the fluid in the container; means sensitive to the density of the fluid connected to said second sensing element and controlling the distance between the plates of said second capacitive sensing element such that the signal derived from said second sensing element is also dependent in magnitude upon the density of the fluid in the container; and comparing means connected to said first and second capacitive sensing elements and nullifying the effect of variations in the dielectric constant and producing a signal indicative of the weight of the fluid in the container.

3. Apparatus for measuring the quantity of fluid in a container comprising in combination: a first capacitive sensing element inserted in a container of fluid and extending from the top to the bottom of the container, said sensing element being sensitive to the volume and dielectric constant of the fluid and connected to a source of alternating voltage of a first phase such as to derive a signal dependent in magnitude upon the volume and dielectric constant of the fluid in the container; a second capacitive sensing element inserted in the container near the bottom of the container and sensitive to the dielectric constant of the fluid and connected to a source of alternating voltage of a second phase such as to derive a signal of opposite phase to the signal derived from said first sensing element, said signal derived from said second sensing element being dependent in magnitude upon the dielectric constant of the fluid in the container; means sensitive to the density of the fluid connected to said second sensing element and controlling the distance between the plates of said second capacitive sensing element such that the signal derived from said second sensing element is also dependent in magnitude upon the density of the fluid in the container; comparing means connected to said first and said second capacitive sensing elements and nullifying the effect of variations in the dielectric constant and producing a signal indicative of the weight of the fluid in the container; and rebalance means connected to said comparing means and the connection of one of the sources of voltage to one of said sensing elements such as to vary the voltage across that sensing element and reduce the difference in magnitude of the signals derived from said sensing elements to zero.

4. Apparatus for measuring the quantity of fluid in a container comprising in combination: a first capacitive sensing element inserted in a container of fluid and extending from the top to the bottom of the container; said sensing element being sensitive to the volume and dielectric constant of the fluid and connected to a source of alternating voltage of a first phase such as to derive a signal dependent in magnitude upon the volume and dielectric constant of the fluid in the container; impedance means connected to a source of alternating voltage of a second phase such as to derive a signal of opposite phase to the signal derived from said first sensing element and of the magnitude of the signal from said first sensing element upon there being no fluid in the container; a second capacitive sensing element inserted in the container near the bottom of the container and sensitive to the dielectric constant of the fluid and connected to a source of alternating voltage of the second phase such as to derive a signal of opposite phase to the signal derived from said first sensing element, said signal derived from said second sensing element being dependent in magnitude upon the dielectric constant of the fluid in the container; means sensitive to the density of the fluid connected to said second sensing element and controlling the distance between the plates of said second capacitive sensing element such that the signal derived from said second sensing element is also dependent in magnitude upon the density of the fluid in the container; and comparing means connected to said first and said second capacitive sensing elements and nullifying the effect of variations in the dielectric constant and producing a signal indicative of the weight of the fluid in the container.

5. Apparatus for measuring the quantity of fluid in a container comprising in combination: a first capacitive sensing element inserted in a container of fluid and extending from the top to the bottom of the container, said sensing element being sensitive to the volume and dielectric constant of the fluid and connected to a source of alternating voltage of a first phase such as to derive a signal dependent in magnitude upon the volume and dielectric constant of the fluid in the container; impedance means connected to a source of alternating voltage of a second phase such as to derive a signal of opposite phase to the signal derived from said first sensing element and of the magnitude of the signal from said first sensing element upon there being no fluid in the container; a second capacitive sensing element inserted in the container near the bottom of the container and sensitive to the dielectric constant of the fluid and connected to a source of alternating voltage of the second phase such as to derive a signal of opposite phase to the signal derived from said first sensing element, said signal derived from said second sensing element being dependent in magnitude upon the dielectric constant of the fluid in the container; further impedance means connected to a source of alternating voltage of the first phase such as to derive a signal of opposite phase to the signal derived from said second sensing element and of the magnitude of the signal from said second sensing element upon there being no fluid between the electrodes of said second sensing element; means sensitive to the density of the fluid connected to said second sensing element and controlling the distance between the plates of said second capacitive sensing element such that the signal derived from said second sensing element is also dependent in magnitude upon the density of the fluid in the container; and comparing means connected to said first and said second capacitive sensing elements and nullifying the effect of variations in the dielectric constant and producing a signal indicative of the weight of the fluid in the container.

6. Apparatus for measuring the quantity of fluid in a container comprising in combination: a first capacitive sensing element inserted in a container of fluid and extending from the top to the bottom of the container, said sensing element being sensitive to the height and dielectric constant of the fluid and connected to a source of alternating voltage of a first phase such as to derive a signal dependent in magnitude upon the height and dielectric constant of the fluid in the container; a second capacitive sensing element having a pair of flat capacitor plates horizontally inserted in the container near the bottom of the container and sensitive to the dielectric constant of the fluid and connected to a source of alternating voltage of a second phase such as to derive a signal of opposite phase to the signal derived from said first sensing element, said signal derived from said second sensing element being dependent in magnitude upon the dielectric constant of the fluid in the container; spring restrained float control means sensitive to the density of the fluid connected to one of the capacitor plates of said second sensing element and controlling the distance between the plates of said second capacitive sensing element such that the signal derived from said second sensing element is also dependent in magnitude upon the density of the fluid in the container; and comparing means connected to said first and said second capacitive sensing elements and nullifying the effect of variations in the dielectric constant and producing a signal indicative of the height and density of the fluid in the container.

7. Apparatus for measuring the quantity of fluid in a container comprising in combination: a first capacitive sensing element inserted in a container of fluid and extending from the top to the bottom of the container, said sensing element being sensitive to the volume and dielectric constant of the fluid and connected to a source of alternating voltage of a first phase such as to derive a signal dependent in magnitude upon the volume and dielectric constant of the fluid in the container; a second capacitive sensing element having a pair of flat capacitor plates horizontally inserted in the container near the bottom of the container and sensitive to the dielectric constant of the fluid and connected to a source of alternating voltage of a second phase such as to derive a signal of opposite phase to the signal derived from said first sensing element, said signal derived from said second sensing element being dependent in magnitude upon the dielectric constant of the fluid in the container; spring restrained float control means sensitive to the density of the fluid connected to one of the capacitor plates of said second sensing element and controlling the distance between the plates of said second capacitive sensing element such that the signal derived from said second sensing element is also dependent in magnitude upon the density of the fluid in the container; and comparing means connected to said first and said second capacitive sensing elements and nullifying the effect of variations in the dielectric constant and producing a signal indicative of the weight of the fluid in the container.

8. Apparatus for measuring the quantity of fluid in a container comprising in combination: a first capacitive sensing element inserted in a container of fluid and extending from the top to the bottom of the container, said sensing element being sensitive to the volume and dielectric constant of the fluid and connected to a source of alternating voltage of a first phase such as to derive a signal dependent in magnitude upon the volume and dielectric constant of the fluid in the container; a second capacitive sensing element having a pair of flat capacitor plates horizontally inserted in the container near the bottom of the container and sensitivie to the dielectric constant of the fluid and connected to a source of alternating voltage of a second phase such as to derive a signal of opposite phase to the signal derived from said first sensing element, said signal derived from said second sensing element being dependent in magnitude upon the dielectric constant of the fluid in the container; spring restrained float control means sensitive to the density of the fluid connected to one of the capacitor plates of said sensing element and controlling the distance between the plates of said second capacitive sensing element such that the signal derived from said second sensing element is also dependent in magnitude upon the density of the fluid in the container; comparing means connected to said first and said second capacitive sensing elements and nullifying the effect of variations in the dielectric constant and producing a signal indicative of the weight of the fluid in the container; and rebalance means connected to said comparing means and the connection of one of the sources of voltage to one of said sensing elements such as to vary the voltage across that sensing element and reduce the difference in magnitude of the signals derived from said sensing elements to zero.

9. Apparatus for measuring the quantity of fluid in a container comprising in combination: a first capacitive sensing element inserted in a container of fluid and extending from the top to the bottom of the container; said sensing element being sensitive to the volume and dielectric constant of the fluid and connected to a source of alternating voltage of a first phase such as to derive a signal dependent in magnitude upon the volume and dielectric constant of the fluid in the container; impedance means connected to a source of alternating voltage of a second phase such as to derive a signal of opposite phase to the signal derived from said first sensing element and of the magnitude of the signal from said first sensing element upon there being no fluid in the container; a second capacitive sensing element having a pair of flat capacitor plates horizontally inserted in the container near the bottom of the container and sensitive to the dielectric constant of the fluid and connected to a source of alternating voltage of the second phase such as to derive a signal of opposite phase to the signal derived from said first sensing element, said signal derived from said second sensing element being dependent in magnitude upon the dielectric constant of the fluid in the container; spring restrained float control means sensitive to the density of the fluid connected to one of the capacitor plates of said second sensing element and controlling the distance between the plates of said second capacitive sensing element such that the signal derived from said second sensing element is also dependent in magnitude upon the density of the fluid in the container; and comparing means connected to said first and said second capacitive sensing elements and nullifying the effect of variations in the dielectric constant and producing a signal indicative of the weight of the fluid in the container.

10. Apparatus for measurng the quantity of fluid in a container comprising in combination: a first capacitive sensing element inserted in a container of fluid and extending from the top to the bottom of the container, said sensing element being sensitive to the volume and dielectric constant of the fluid and connected to a source of alternating voltage of a first phase such as to derive a signal dependent in magnitude upon the volume and dielectric constant of the fluid in the container; impedance means connected to a source of alternating voltage of a second phase such as to derive a signal of opposite phase to the signal derived from said first element and of the magnitude of the signal from said first sensing element upon there being no fluid in the container; a second capacitive sensing element having a pair of flat capacitor plates horizontally inserted in the container near the bottom of the container and sensitive to the dielectric constant of the fluid and connected to a source of alternating voltage of the second phase such as to derive a signal of opposite phase to the signal derived from said first sensing element, said signal derived from said second sensing element being dependent in magnitude upon the dielectric constant of the fluid in the container; further impedance means connected to a source of alternating voltage of the first phase such as to derive a signal of opposite phase to the signal derived from said second sensing element and of the magnitude of the signal from said second sensing element upon there being no fluid in the container; spring restrained float control means sensitive to the density of the fluid connected to one of the capacitor plates of said second sensing element and controlling the distance between the plates of said second capacitive sensing element such that the signal derived from said second sensing element is also dependent in magnitude upon the density of the fluid in the container; and comparing means connected to said first and said second capacitive sensing elements and nullifying the effect of variations in the dielectric constant and producing a signal indicative of the weight of the fluid in the container.

11. Apparatus for measuring the quantity of fluid in a container comprising in combination: a first capacitive sensing element inserted in a container of fluid and extending from the top to the bottom of the container, said sensing element being sensitive to the volume and dielectric constant of the fluid and connected to a source of alternating voltage of a first phase such as to derive a signal dependent in magnitude upon the volume and dielectric constant of the fluid in the container; impedance means connected to a source of alternating voltage of a second phase such as to derive a signal of opposite phase to the signal derived from said first sensing element and of the magnitude of the signal from said first sensing element upon there being no fluid in the container; a second capacitive sensing element inserted in the container near the bottom of the container and sensitive to the dielectric constant of the fluid and connected to a source of alternating voltage of the second phase such as to derive a signal of opposite phase to the signal derived from said first sensing element, said signal derived from said second sensing element being dependent in magnitude upon the dielectric constant of fluid in the container; further impedance means connected to a source of alternating voltage of the first phase such as to derive a signal of opposite phase to the signal derived from said second sensing element and of the magnitude of the signal from said second sensing element upon there being no fluid between the electrodes of said second sensing element; means sensitive to the density of the fluid connected to said second sensing element and controlling the distance between the plates of said second capacitive sensing element such that the signal derived from said second sensing element is also dependent in magnitude upon the density of the fluid in the container; means fixedly connecting said further impedance means to the movable plate of said second sensing element such that the impedance of said further impedance means varies with variation of the distance between the plates of said second sensing element; and comparing means connected to said first and said second capacitive sensing elements and nullifying the effect of variations in the dielectric constant and producing a signal indicative of the weight of the fluid in the container.

12. Apparatus for measuring the quantity of fluid in a container comprising, in combination: a first capacitive sensing element inserted in a container of fluid and extending from the top to the bottom of the container, said sensing element being sensitive to the volume and dielectric constant of the fluid and connected to a source of alternating voltage of a first phase such as to derive a signal dependent in magnitude upon the volume and dielectric constant of the fluid in the container; impedance means connected to a source of alternating voltage of a second phase such as to derive a signal of opposite phase to the signal derived from said first sensing element and of the magnitude of the signal from said first sensing element upon there being no fluid in the container; a second capacitive sensing element having a pair of flat capacitor plates horizontally inserted in the container near the bottom of the container and sensitive to the dielectric constant of the fluid and connected to a source of alternating voltage of the second phase such as to derive a signal of opposite phase to the signal derived from said first sensing element, said signal derived from said second sensing element being dependent in magnitude upon the dielectric constant of the fluid in the container; further impedance means connected to a source of alternating voltage of the first phase such as to derive a signal of opposite phase to the signal derived from said second sensing element and of the magnitude of the signal from said second sensing element upon there being no fluid in the container; spring restrained float control means sensitive to the density of the fluid connected to one of the capacitor plates of said second sensing element and controlling the distance between the plates of said second capacitive sensing element such that the signal derived from said second sensing element is also dependent in magnitude upon the density of the fluid in the container; means fixedly connecting said further impedance means to the movable plate of said second sensing element such that the impedance of said further impedance means varies with variation of the distance between the plates of said second sensing element; and comparing means connected to said first and said second capacitive sensing elements and nullifying the effect of variations in the dielectric constant and producing a signal indicative of the weight of the fluid in the container.

13. Apparatus for measuring the quantity of fluid in a container comprising, in combination: a first capacitive sensing element inserted in a container of fluid and extending from the top to the bottom of the container, said sensing element being sensitive to the volume and dielectric constant of the fluid and connected to a source of alternating voltage of a first phase such as to derive a signal dependent in magnitude upon the volume and dielectric constant of the fluid in the container; a capacitor connected to a source of alternating voltage of a second phase such as to derive a signal of opposite phase to the signal derived from said first sensing element and of the magnitude of the signal from said first sensing element upon there being no fluid in the container; a second capacitive sensing element inserted in the container near the bottom of the container and sensitive to the dielectric constant of the fluid and connected to a source of alternating voltage of the second phase such as to derive a signal of opposite phase to the signal derived from said first sensing element, said signal derived from said second sensing element being dependent in magnitude upon the dielectric constant of the fluid in the container; a second capacitor connected to a source of alternating voltage of the first phase such as to derive a signal of opposite phase to the signal derived from said second sensing element and of the magnitude of the signal from said second sensing element upon there being no fluid between the electrodes of said second sensing element; means sensitive to the density of the fluid connected to said second sensing element and controlling the distance between the plates of said second capacitive sensing element such that the signal derived from said second sensing element is also dependent in magnitude upon the density of the fluid in the container; means fixedly connecting one of the plates of said second capacitor to the movable plate of said second sensing element such that the distance between the plates of said second capacitor varies with variation of the distance between the plates of said second sensing element; and comparing means connected to said first and said second capacitive sensing elements and nullifying the effect of variations in the dielectric constant and producing a signal indicative of the weight of the fluid in the container.

14. Apparatus for measuring the quantity of fluid in a container comprising, in combination: a first capacitive sensing element inserted in a container of fluid and extending from the top to bottom of the container, said sensing element being sensitive to the volume and dielectric constant of the fluid and connected to a source of alternating voltage of a first phase such as to derive a signal dependent in magnitude upon the volume and dielectric constant of the fluid in the container; a capacitor connected to a source of alternating voltage of a second phase such as to derive a signal of opposite phase to the signal derived from said first sensing element and of the magnitude of the signal from said first sensing element upon there being no fluid in the container; a second capacitive sensing element having a pair of flat capacitor plates horizontally inserted in the container near the bottom of the container and sensitive to the dielectric constant of the fluid and connected to a source of alternating voltage of the second phase such as to derive a signal of opposite phase of the signal derived from said first sensing element, said signal derived from said second sensing element being dependent in magnitude upon the dielectric constant of the fluid in the container; a second capacitor connected to a source of alternating voltage of the first phase such as to derive a signal of opposite phase to the signal derived from said second sensing element and of the magnitude of the signal from said second sensing element upon there being no fluid in the container; spring restrained float control means sensitive to the density of the fluid connected to one of the capacitor plates of said second sensing element and controlling the distance between the plates of said second capacitive sensing element such that the signal derived from said second sensing element is also dependent in magnitude upon the density of the fluid in the container; means fixedly connecting one of the plates of said second capacitor to the movable plate of said second sensing element such that the distance between the plates of said second capacitor varies with variation of the distance between the plates of said second sensing element; and comparing means connected to said first and said second capacitive sensing elements and nullifying the effect of variations in the dielectric constant and producing a signal indicative of the weight of the fluid in the container.

References Cited in the file of this patent

UNITED STATES PATENTS

| | | |
|---|---|---|
| 2,082,539 | Fisher | June 1, 1937 |
| 2,540,658 | De Giers | Feb. 6, 1951 |
| 2,563,281 | Griffith | Aug. 7, 1951 |
| 2,581,085 | Edelman | Jan. 1, 1952 |
| 2,622,442 | Boisblanc | Dec. 23, 1952 |
| 2,662,404 | Sontheimer | Dec. 15, 1953 |
| 2,691,296 | De Giers | Oct. 12, 1954 |
| 2,724,273 | Sontheimer | Nov. 22, 1955 |
| 2,728,035 | Meredith | Dec. 20, 1955 |

FOREIGN PATENTS

| | | |
|---|---|---|
| 673,988 | Great Britain | June 18, 1952 |
| 684,348 | Great Britain | Dec. 17, 1952 |
| 1,041,846 | France | June 3, 1953 |